US007356687B2

(12) United States Patent
Medvinsky et al.

(10) Patent No.: US 7,356,687 B2
(45) Date of Patent: Apr. 8, 2008

(54) ASSOCIATION OF SECURITY PARAMETERS FOR A COLLECTION OF RELATED STREAMING PROTOCOLS

(75) Inventors: Alexander Medvinsky, San Diego, CA (US); Petr Peterka, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 954 days.

(21) Appl. No.: 10/153,445

(22) Filed: May 21, 2002

(65) Prior Publication Data

US 2003/0221099 A1    Nov. 27, 2003

(51) Int. Cl.
*H04L 9/00* (2006.01)
*G06F 9/00* (2006.01)
(52) U.S. Cl. .................. 713/151; 713/160; 726/14
(58) Field of Classification Search ............... 713/153
See application file for complete search history.

(56) References Cited

U.S. PATENT DOCUMENTS

| | | | |
|---|---|---|---|
| 5,455,953 A | 10/1995 | Russell | |
| 5,535,276 A | 7/1996 | Ganesan | |
| 6,189,146 B1 | 2/2001 | Misra et al. | |
| 6,389,541 B1 | 5/2002 | Patterson | |
| 6,591,250 B1 * | 7/2003 | Johnson et al. | 705/51 |
| 6,615,258 B1 * | 9/2003 | Barry et al. | 709/223 |
| 7,010,727 B1 * | 3/2006 | Stucker | 714/52 |
| 2002/0047899 A1 | 4/2002 | Son et al. | |
| 2002/0049679 A1 | 4/2002 | Russell et al. | |
| 2002/0099854 A1 * | 7/2002 | Jorgensen | 709/249 |

(Continued)

FOREIGN PATENT DOCUMENTS

EP    1041823 A2    10/2000

(Continued)

OTHER PUBLICATIONS

Aura, Tuomas, "Distributed Access-Rights Management With Delegation Certificates," Secure Internet Progamming (LNCS 1603), pp. 211-235, 1999.

(Continued)

*Primary Examiner*—Gilberto Barron
*Assistant Examiner*—Abdulhakim Nobahar
(74) *Attorney, Agent, or Firm*—Benjamin D. Driscoll

(57) ABSTRACT

In a client-server system employing protocols such as RTP (real-time protocol), RTCP (real-time control protocol) and RTSP (real-time streaming protocol) for communicating real-time data stream, a method for using the same security parameters to secure by encryption and/or authentication, communication of the real-time data stream. The method includes establishing two or more security parameters for securing communications during the streaming session; establishing a session identifier associated with the security parameters; transmitting, from client to server, an RTSP message for requesting the real-time data stream, the RTSP message being secured with the security parameters; establishing a streaming session for streaming an RTP message containing the real-time data, the RTP message being secured with the security parameters; transmitting, from client to server, an RTCP protocol message containing statistics relating to the streaming session, the RTCP message being secured with the security parameters, and exchanging any one or more additional RTSP, RTP and RTCP messages in any order, each message being secured with the security parameters which are identifiable with the session identifier.

7 Claims, 5 Drawing Sheets

U.S. PATENT DOCUMENTS

| | | |
|---|---|---|
| 2002/0099948 A1 | 7/2002 | Kocher et al. |
| 2002/0133699 A1 | 9/2002 | Pueschel |
| 2002/0172368 A1 | 11/2002 | Peterka |
| 2003/0005144 A1* | 1/2003 | Engel et al. ............... 709/235 |
| 2003/0046238 A1 | 3/2003 | Nonaka et al. |
| 2003/0059005 A1* | 3/2003 | Meyerson et al. ....... 379/88.17 |
| 2003/0115364 A1* | 6/2003 | Shu et al. ................... 709/246 |
| 2003/0236745 A1* | 12/2003 | Hartsell et al. ............... 705/40 |
| 2005/0216731 A1* | 9/2005 | Saito et al. ................. 713/153 |

FOREIGN PATENT DOCUMENTS

| | | |
|---|---|---|
| EP | 1 089 488 A1 | 4/2001 |
| WO | WO 00/11849 A1 | 3/2000 |
| WO | WO 01/56249 A1 | 8/2001 |
| WO | WO 01/98903 A1 | 12/2001 |
| WO | WO 01/99374 A2 | 12/2001 |
| WO | WO 02/45316 A2 | 6/2002 |
| WO | WO 02/45316 A3 | 6/2002 |
| WO | WO 02/084980 A1 | 10/2002 |
| WO | WO 03/045036 A2 | 5/2003 |

OTHER PUBLICATIONS

Christin, Nicolas, "Multicasting Of Real-Time Data RTP, RTCP, RTSP," 43 pages, Nov. 9, 1999.

Ganesan, Ravi, "Yaksha: Augmenting Kerberos With Public Key Cryptography," IEEE, pp. 132-143, 1995.

Kohl, J et al., "The Kerberos Network Authentication Service (V5)," 97 pages, Sep. 1993.

Maughan, D. et al., "Internet Security Association And Key Management Protocol (ISAKMP)," The Internet Society, 81 pages, Nov. 1998.

Schulzrinne, H. et al., "RTP: A Transport Protocol For Real-Time Applications," 75 pages, Jan. 1996.

* cited by examiner

US 7,356,687 B2

ASSOCIATION OF SECURITY PARAMETERS FOR A COLLECTION OF RELATED STREAMING PROTOCOLS

CROSS-REFERENCES TO RELATED APPLICATIONS

This application is related to the following U.S. nonprovisional applications, U.S. patent application Ser. No. 10/194,922, entitled "KEY MANAGEMENT INTERFACE TO MULTIPLE AND SIMULTANEOUS PROTOCOLS"; U.S. patent application Ser. No. 10/092,347, entitled "KEY MANAGEMENT PROTOCOL AND AUTHENTICATION SYSTEM FOR SECURE INTERNET PROTOCOL RIGHTS MANAGEMENT ARCHITECTURE" filed Mar. 4, 2002; U.S. patent application Ser. No. 10/183,130, entitled "ENCRYPTION OF STREAMING CONTROL PROTOCOLS AND THEIR HEADERS", U.S. patent application Ser. No. 09/966,552, entitled "UNIQUE ON-LINE PROVISIONING OF USER SYSTEMS ALLOWING USER AUTHENTICATION" filed Sep. 26, 2001; and U.S. patent application Ser. No. 10/170,951, entitled "ACCESS CONTROL AND KEY MANAGEMENT SYSTEM FOR STREAMING DATA", all of which are hereby incorporated by reference in their entirety as set forth in full in the present invention, for all purposes.

BACKGROUND OF THE INVENTION

The present invention relates generally to the field of data communication and more specifically to rights management and securing data communicated in a network.

A growing interest in streaming distribution of multimedia streaming content over Internet Protocol (IP) networks has resulted in a growing need for key management systems. One such streaming distribution system is the Aerocast Network™ developed by Aerocast, Inc. of San Diego, Calif. As discussed with reference to FIG. 1, although the existing phase 1 Aerocast Network facilitates delivery of content, it lacks security and key management for the network.

FIG. 1 is a block diagram of a network 100 (by Aerocast) for facilitating streaming of content over a communication network.

Among other components, network 100 includes a content provider 102 for generating content intended for a consumer 116, Internet 114 through which content is streamed, and a central server 104 to which content provider 102 publishes its contents. Central server 104 contains a database 108 for storing content information, and a search engine 110 for searching database 108. Network 100 further comprises a provisioning center 106, and caching servers 112, 113 and 115.

In operation, consumer 116 wishing to access content by content provider 102, streams the content from the closest caching server, in this case, caching server 115. In conventional systems without caching servers, consumer 116 desiring such content streams obtains content directly from content provider 102. Not only does this result in poor content quality, delays associated with inadequate bandwidth may result. By using the caching servers, network 100 avoids disadvantages associated with direct streaming of digital content from content provider 202. Caching servers 112, 113 and 115 may be local DSL (digital subscriber line) providers, for example.

Network 100 provides a further advantage. When searching for content, consumer 116 need not search any and all databases on Internet 114. All content providers (including content provider 102) on network 100 publish descriptions of their content to a single central database 108. For streaming video content, for example, such descriptions may include the movie name, actors, etc. In this manner, when content is desired, consumer 116 uses search engine 110 to search database 108. When the content is found, database 108 thereafter provides a link to content provider 202 having the desired streaming content. Content provider 102 is then accessed by consumer 116 to obtain more detail. Such details include pricing information, etc.

A mechanism is provided whereby consumer 116 provides a list of caching servers closest to it to content provider 102. In response to consumer 116's request, content provider 102 selects the appropriate caching server closest to consumer 116 for streaming the content. It should be observed, however, that in today's Aerocast network content is streamed in the clear by network 100. Disadvantageously, because it is unprotected, the content may be intercepted by an unauthorized consumer resulting in substantial losses to content providers and consumers. Some of these disadvantages are resolved by the aforementioned related patent applications commonly owned and concurrently filed herewith, and hereby incorporated by reference as if set forth in its entirety in the present specification.

Generally, to deliver, manage and control streaming content, several different protocols may be employed. For example, a collection of protocols are RTP (real-time protocol), RTCP (real-time control protocol) and RTSP (real-time streaming protocol) may be employed for stream real-time data. RTP which is specified in RFC (request for comments) 1889, which runs on top of UDP (user datagram protocol).

Among other functionalities, RTP provides end to end transport functions for real time transmission of content such as audio and video over point to point or multicast services. RTCP (Real-time Control Protocol) is a companion protocol providing QoS (quality of service) monitoring and delivering statistics on the media stream session, which may be used by the sender to adjust its timing. In addition, at least in a point-to-point case (and possibly in the multicast case) RTP and RTCP are accompanied by RTSP (Real-time Session Protocol), used to request particular content, provide content description, pause and re-start the media stream for point-to-point connections, etc.

While protection for RTP packets are provided, conventional digital rights management systems provide little or no protection for RTSP and RTCP packets. Disadvantageously, such a system would be open to additional denial of service attacks due to lack of RTCP and RTSP message integrity and would not provide user privacy (e.g. for user viewing patterns). Moreover, there is no single key negotiation for each streaming session that would provide all of the keys necessary for each of the protocols associated with the media streaming (e.g. RTP/RTCP/RTSP).

Therefore, there is a need to resolve one or more of the aforementioned problems and the present invention meets this need.

BRIEF SUMMARY OF THE INVENTION

According to a first aspect, this invention is a single key management system for creating a set of security parameters for a collection of related protocols. Protocols such as RTSP (real-time streaming protocol), RTP (real-time protocol) and RTCP (real-time control protocol) messages are secured. These protocols which permit streaming of real-time data from a server to client, are secured by security parameters.

A security parameter may be a MAC (message authentication code) key, content encryption/decryption keys, etc.

In one aspect, for example, security parameters include an encryption key for encrypting outbound messages and an authentication key for authenticating outbound messages. Security parameters may also include decryption and authentication keys for inbound messages. Advantageously, all security parameters needed for a streaming session are created at one time. Moreover, an identifier is employed for collectively tying all of the related protocols.

According to another aspect of the present invention, a method for securely transferring the real-time data stream is taught. This method includes the steps of establishing two or more security parameters for securing the streaming session. Thereafter, a session identifier associated with the security parameters is established. In this manner, all parameters related to the streaming session are easily identifiable.

Real-time data is securely transferred by exchanging the RTSP, RTP and RTCP messages in any order. For example, the client transmits an RTSP message to the server requesting the real-time data stream. In response, the server sends an RTSP message containing a list of RTP and RTCP ports for streaming the real data time stream. These messages are secured by the security parameters. Note that the security parameters are identifiable using the session identifier.

According to another aspect of the present invention, a method for securing a real-time data stream with a MAC key and an encryption key is disclosed. The method includes a number of steps. First, RTSP messages authenticated with the MAC key are exchanged between a client and a server. Further, the server transmits RTP messages to the client for streaming the real-time data. Similarly, the RTP messages are encrypted with the encryption key, and authenticated with the MAC key. RTCP messages are further exchanged to facilitate secure streaming of real time data. These RTCP messages are encrypted with the encryption key and authenticated with the MAC key. In this manner, the real-time data is securely streamed from the server to the client. Note that the messages can be encrypted, authenticated or both.

Advantageously, the present invention is convenient, and simplifies the complexity of secure real-time data streaming by having a single set of security parameters associated with a common session identifier that associates these protocols to a single secure session.

Figure 1:
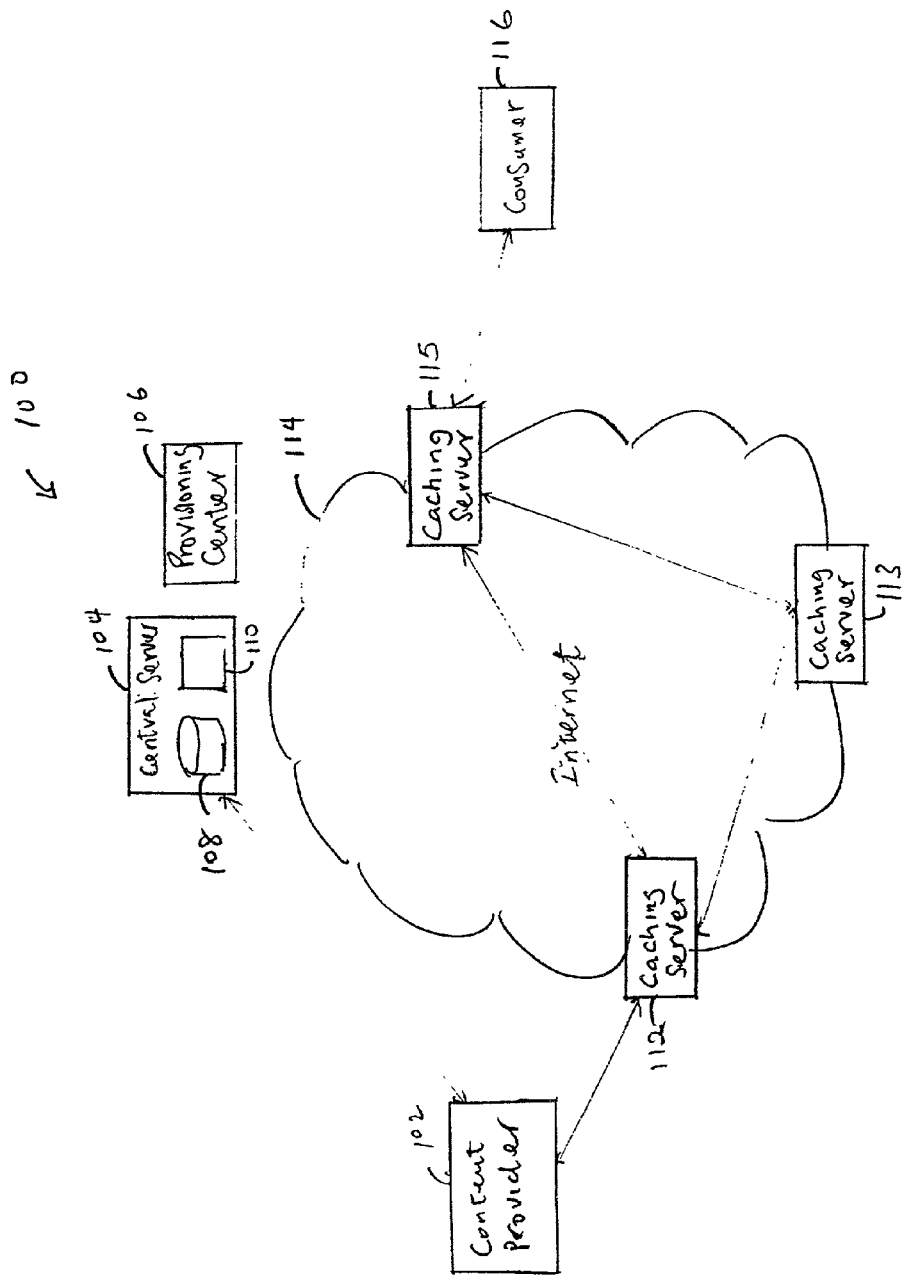
FIG. 1 is a block diagram of a network for facilitating streaming of content over a communication network.

A further understanding of the nature and advantages of the present invention herein may be realized by reference to the remaining portions of the specification and the attached drawings. References to "steps" of the present invention should not be construed as limited to "step plus function" means, and is not intended to refer to a specific order for implementing the invention. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

Briefly, according to a first aspect, this invention is a single key management system for creating a set of security parameters. This single set of security parameters are used to secure a collection of related protocols. Protocols such as RTSP (real-time streaming protocol), RTP (real-time protocol) and RTCP (real-time control protocol) messages are secured during streaming of real-time data from a server to client.

A client initiates communication with a server having the real-time data. Initially, the security parameters for securing the streaming session are derived. Thereafter, a session identifier associated with the security parameters are established. Next, using an RTSP message, the client requests the real-time data stream from the server. After the RTSP message is received, the server establishes a streaming session for streaming an RTP message containing the real-time data packets, the RTP message being secured with the security parameters. Also, the RTSP message is secured as well. One or more of the RTCP, RTP and RTSP messages are exchanged in any order, each message being secured with the security parameters which are identifiable with the session identifier. In this manner, these protocols are secured by encryption and authentication in order to securely stream data from the server to the client.

While the present invention will be described with reference to RTP, TCP and RTSP, one of ordinary skill in the art will understand that it is applicable to other type protocols within the spirit of the present invention. For example, the present invention may be applicable to Real Network's protocol.

Figure 2:
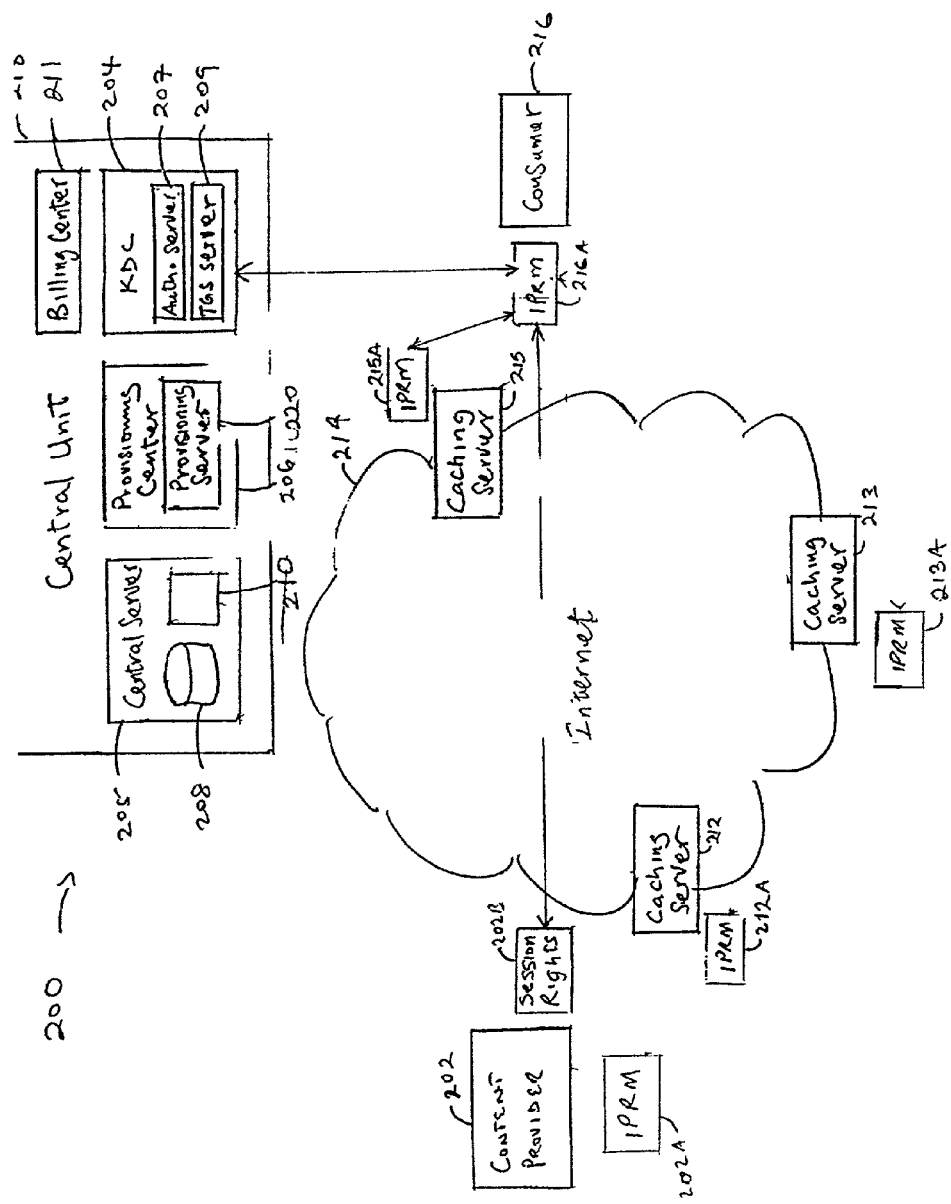
FIG. 2 is a block diagram of an IPRM (Internet protocol rights management) system incorporating the ES Broker™ protocol for applying key management and security to the network of FIG. 1 in accordance with an exemplary embodiment of the present invention.

FIG. 2 is a block diagram of an IPRM (Internet protocol rights management) system 200 incorporating the ESBroker™ protocol for applying key management and security to network 100 of FIG. 1 in accordance with an exemplary embodiment of the present invention.

Among other components, IPRM system 200 comprises a content provider 202, consumer 216, Internet 214, a provisioning center 206, a central server 205 that contains both a content description database 208 and a search engine 210, caching servers 212, 213 and 215 all of which function in a similar manner to those of the corresponding components in FIG. 1. In addition, IPRM system 200 comprises a KDC (key distribution center) 204 containing an AS (authentication server) 207 for issuing a TGT (ticket granting ticket) to consumer 216, a TGS (ticket granting server) 209 for providing server tickets to access particular servers, a provisioning server 220, and a billing center 211. KDC 204, billing center 211, provisioning center 206 and central server 205 are all located within a central unit 218 for facilitating provisioning of services within IPRM system 200.

Further, IPRM system 200 contains an IPRM agent 202A for administering rights management for content provider 202, a session rights object 202B for defining user selection and content access rules for content to be streamed, an IPRM agent 212A for administering rights management for caching server 212, IPRM agent 213A for administering rights management for caching server 213, IPRM agent 215A for administering rights management for caching server 215, IPRM agent 216A for administering rights management for consumer 216, and a viewer (not shown) within consumer 216 for receiving desired content. Although not shown, the foregoing components may be located within their associated components. For example, IPRM agent 202A is locatable within content provider 202 rather than externally as shown.

As noted, IPRM system 200 generally functions to facilitate streaming of content in a secure fashion, to consumer 216 by using caching servers 212, 213 and 215. Content provider 202 provides content only once and thereafter it can be moved among the caching servers. The reason for the caching servers are to move the content closer to the edges of IPRM system 200. This improves the streaming performance and allows smaller content providers to sell their content without the need to buy expensive hardware for media streaming. It also allows introduction of an IP multicast (communication between a single sender and multiple receivers on a network) only at the caching servers. With current technology it is easier to have an IP multicast limited to a local access network than to have an IP multicast over the Internet.

The present invention in accordance with a first embodiment provides security to IPRM system 200 via KDC 204, IPRM agents 202A, 212A, 213A, 215A, and 216A. The IPRM agents in conjunction with KDC 204 and provisioning center 206 provide authentication, privacy, integrity, access control and non-repudiation tools to all aspects of IPRM system 200. For example, before a consumer can utilize the system for streaming content, a registration process is required. Secure registration for the consumer is provided by IPRM system 200. Thus, during the registration process, no one else may replicate the identity of consumer 216 by intercepting messages between consumer 216 and KDC 204. KDC 204 is a trusted entity and provides key distribution to network components using a blend of symmetric and asymmetric algorithms.

KDC 204 and the IPRM components may be purely software protection, with a limited trust placed upon consumer 216s, or may be hardware security modules, which may be mandatory to obtain rights to high quality content from copyright owners requiring high security levels, or may be a combination of both software and hardware. IPRM uses an authenticated key management protocol with high scalability to millions of consumers. The key management protocol is called ESBroker™ (Electronic Security Broker), a product of Motorola, Inc., San Diego Calif., will be referenced throughout this specification.

The ESBroker™ protocol partly based on the Kerberos framework consists of client interactions with the centralized Key Distribution Center (KDC 204) as well as with the individual application servers. A KDC client is any host that can send requests to the KDC. Within the IPRM system this includes consumers, caching servers and other IPRM system components. An application server is any server registered with the KDC for which a client might request a service ticket (e.g. caching server, Billing Center, etc.). The same host may be both a KDC client and an application server at the same time. For the IPRM system 200, the protocol employs a series of messages to accomplish key management between client and server interfaces of the system. This key management protocol is intended to be of general use for establishing secure sessions and is not restricted to the IPRM system. These messages listed in Table 1 below, are further described in the section entitled IPRM Protocol Messages.

TABLE 1

| Code | Message Type | Description |
|---|---|---|
| 1 | CLIENT_ENROLL_REQ | Client enrollment request, containing client public key and other attributes |
| 2 | CLIENT_ENROLL_REP | Client enrollment reply from KDC 204, possibly containing a client certificate for the public key. |
| 3 | AS_REQ | Request Ticket Granting Ticket from the Authentication Server |
| 4 | AS_REP | Reply from Authentication Server with the TGT |
| 5 | TGS_REQ | Request service ticket from TGS server 209 |
| 6 | TGS_REP | Reply from TGS server 209 with the service ticket |
| 7 | TKT_CHALLENGE | Server requests this client to initiate key management |
| 8 | KEY_REQ | Key Management request from client |
| 9 | KEY_REP | Key Management reply from the application server |
| 10 | SEC_ESTABLISHED | An ACK from client to an application server stating that security is established |
| 11 | ESB_ERR | Error reply message |
| 12 | INIT_PRINCIPAL_REQ | Create a Provisioning Ticket for a specified principal. If the specified principal doesn't already exist, it will be initialized in KDC 204 database. |
| 13 | INIT_PRINCIPAL_REP | Returns a Provisioning Ticket for the specified principal. |
| 14 | DELETE_PRINCIPAL_REQ | Delete a specified ESBroker ™ principal from KDC 204 database. |
| 15 | DELETE_PRINCIPAL_REP | Acknowledgment to DELETE_PRINCIPAL_REQ |
| 16 | SERVICE_KEY_REQ | Application server requests a new service key from KDC 204. |
| 17 | SERVICE_KEY_REP | KDC 204 returns a new service key to the application server. |
| 18 | AUTH_DATA_REQ | KDC 204 requests authorization data for a particular principal. This may be part or all of the authorization data that will appear in a ticket that KDC 204 subsequently issues. |
| 19 | AUTH_DATA_REP | Authorization Server returns the data requested with AUTH_DATA_REQ. |

In operation, the key management process between a client and a server is classified two phases: (1) a generic phase in which a client is in contact with KDC 204 to obtain a server ticket to access the server; and (2) a non-generic phase in which the client uses the server ticket to form a KEY_REQ (key request) message to the server. In the non-generic phase, a DOI (domain of interpretation) object containing information that is specific to a particular application of a general ESBroker key management protocol (e.g. specifically for the IPRM System). For example, in a key management process between consumer 216 (client) and caching server 215 (server), the generic phase involves obtaining, by consumer 216, a server ticket from KDC 204 for accessing caching server 215. The non-generic process involves using the server ticket to generate the KEY_REQ message for accessing caching server 215, wherein the KEY_REQ contains the DOI object that contains the Session Rights. Furthermore, which messages are used in the protocol depend on whether key management is client or server initiated. If server initiated, the TKT_CHALLENGE (ticket challenge) message is employed in addition to other messages as more clearly shown with reference to FIG. 3.

Figure 3:
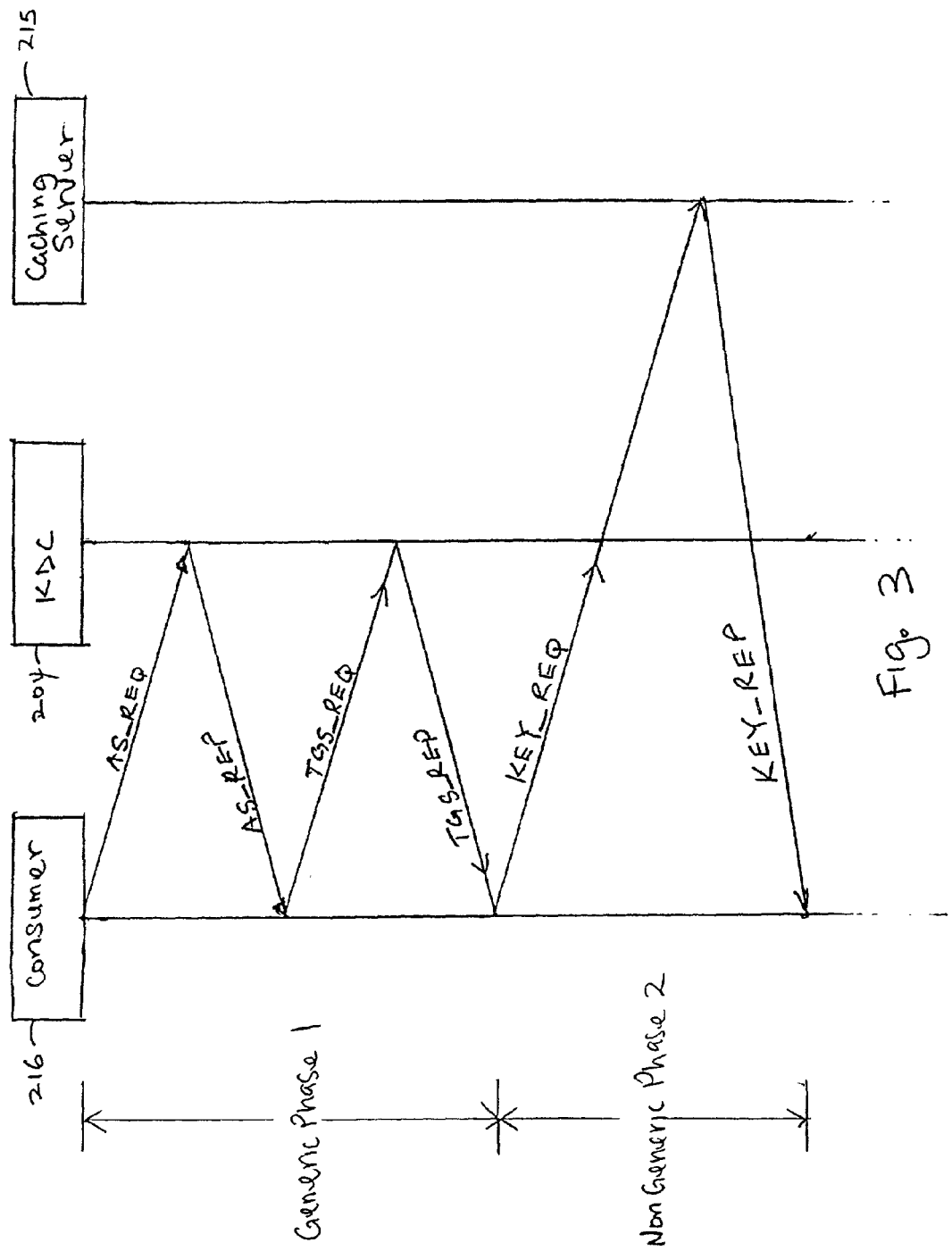
FIG. 3 is a high-level flow diagram of the security and key management protocol when key management is initiated by a consumer (client) to a caching server (server) in accordance with an exemplary embodiment of the present invention.

FIG. 3 is a high-level flow diagram of the security and key management protocol when key management is initiated by consumer 216 (client) to caching server 215 (server) in accordance with an exemplary embodiment of the present invention. Of course, it is assumed that both consumer 216 and caching server 215 have been registered by KDC 204 which acts as a trusted authenticator and can verify the identity of both nodes.

As shown, consumer 216 wishing to stream content from caching server 215 in a secure manner initiates the key management process. This is done by transmitting an AS_REQ message to KDC 204 to obtain a TGT (ticket granting ticket) for TGS server 209. The AS_REQ message contains the consumer 216's identity, KDC 204's identity, more specifically the KDC realm or administrative domain, and a nonce to tie it to a response. It may also contain a list of symmetric encryption algorithms that are supported by consumer 216.

As shown, in response to the AS_REQ message, KDC 204 validates the TGT request, checks its local database for validity of consumer 216 and thereafter responds with an AS_REP message containing the TGT. It should be noted that the private portion of the TGT is encrypted with KDC 204's service key known only to KDC 204. The same KDC 204 service key is also used to authenticate the TGT with a keyed hash. Since consumer 216 does not know KDC 204 service key, it cannot modify it and cannot read the private part of the ticket. Because consumer 216 still needs to know the session key for subsequent authentication to KDC 204, another copy of the session key is delivered to consumer 216 using a key agreement algorithm (e.g., Elliptic Curve Diffie-Hellman).

After receiving and storing the TGT, consumer 216 is ready to start requesting streaming content on this network. A TGS_REQ message containing the TGT is sent to KDC 204 (TGS server 209) requesting a ticket for caching server 215. It should be noted that consumer 216 might perform additional provisioning actions, such as subscribe to a particular content provider. Also, consumer 216 may create a list of preferred caching servers.

Responsive to the TGS_REQ message, a TGS_REP message having the caching server ticket is transmitted to consumer 216 from KDC 204. If there are additional preferred caching servers, consumer 216 may contact KDC 204 to obtain caching server tickets for the preferred caching servers using the TGT. These caching server tickets may then be cached for later use. Otherwise, the caching server tickets are obtained at the time of requesting the content from the appropriate caching server.

For some consumers, KDC 204 first needs to query provisioning server 220 for subscriber authorization data before issuing the caching server tickets. This is accomplished with an AUTH_DATA_REQ/AUTH_DATA_REP exchange between KDC 204 and the provisioning server 220. The user authorization data is insertable into the tickets. The caching server ticket has the same format as the TGT—it includes a session key used for authentication to the caching server 215. The private part of the ticket is encrypted with caching server 215's service key known only to it and KDC 204. The ticket is also authenticated with a hash that is keyed with the same service key. As is the case with the TGT, consumer 216 is not able to modify this ticket. Consumer 216 needs the session key from the caching server ticket to authenticate itself to this server. A copy of this session key is delivered to consumer 216, encrypted with the TGT session key.

This process beginning with the AS_REQ message to the TGS_REP message corresponds to the generic phase noted above wherein a client is in contact with KDC 204 to obtain a server ticket to access the server. Because it is generic, the same process is used to secure other interfaces for delivery of content from content provider to caching servers; reporting of usage; billing, etc. Further, this results in a more secure IPRM system without the need for unnecessary or complex options. Moreover, because of the reduction in complexity, problems are identified and rectified in an expeditious fashion.

Upon receiving the TGS_REP message containing the caching server ticket, a KEY_REQ message with the ticket is sent to caching server 215. The KEY_REQ message contains a MAC (message authentication code) of the message, DOI (domain of interpretation) object and a time stamp in addition to the caching server ticket. A DOI object is for carrying application specific information associated with this secure session. In the present embodiment, the DOI object contains session rights information for consumer 216. The reason for encapsulating the session rights into this DOI object is because the session rights are specific to this particular content delivery architecture (with caching servers), while the ESBroker protocol provides generic key management services. ESBroker could be applied to other types of secure sessions, with their application-specific information also encapsulated in the DOI object.

When caching server 215 receives the generic KEY_REQ message, it extracts the non-generic DOI object. Caching server 215 then checks application specific code for streaming, for example, verifies the DOI object, and authorization information. If the session rights matches the authorization data in the ticket, a KEY_REP message containing a sub-session key is forwarded to consumer 216. Note that the sub-session key is not the same session key in the ticket. The sub-session key is used to derive the security parameters. From that point, both sides have a protocol key and can start encrypting their final messages such as streaming content. If authorization fails, an error message is forwarded to the consumer. It should be noted that in some instances, the KEY_REP message contains a generic DOI object where caching server 215 needs to return some application specific information to consumer 216. For example, in the IPRM system, when the caching server sends a Ticket Challenge to the content provider to request a secure session, the session ID is provided later by the caching server, inside the DOI object in the KEY_REP message. The Ticket Challenge message is not authenticated and therefore does not contain a DOI object.

This phase (KEY_REQ/KEY_REP) corresponds to the non-generic phase in which the client uses the server ticket to form a key request to the server. This phase is non-generic because the DOI object varies depending on the interface being secured. For example, the DOI object relating to delivery of content from content provider to caching servers is different from that employed for delivery of the same content from a caching server to subscribers.

Figure 4:
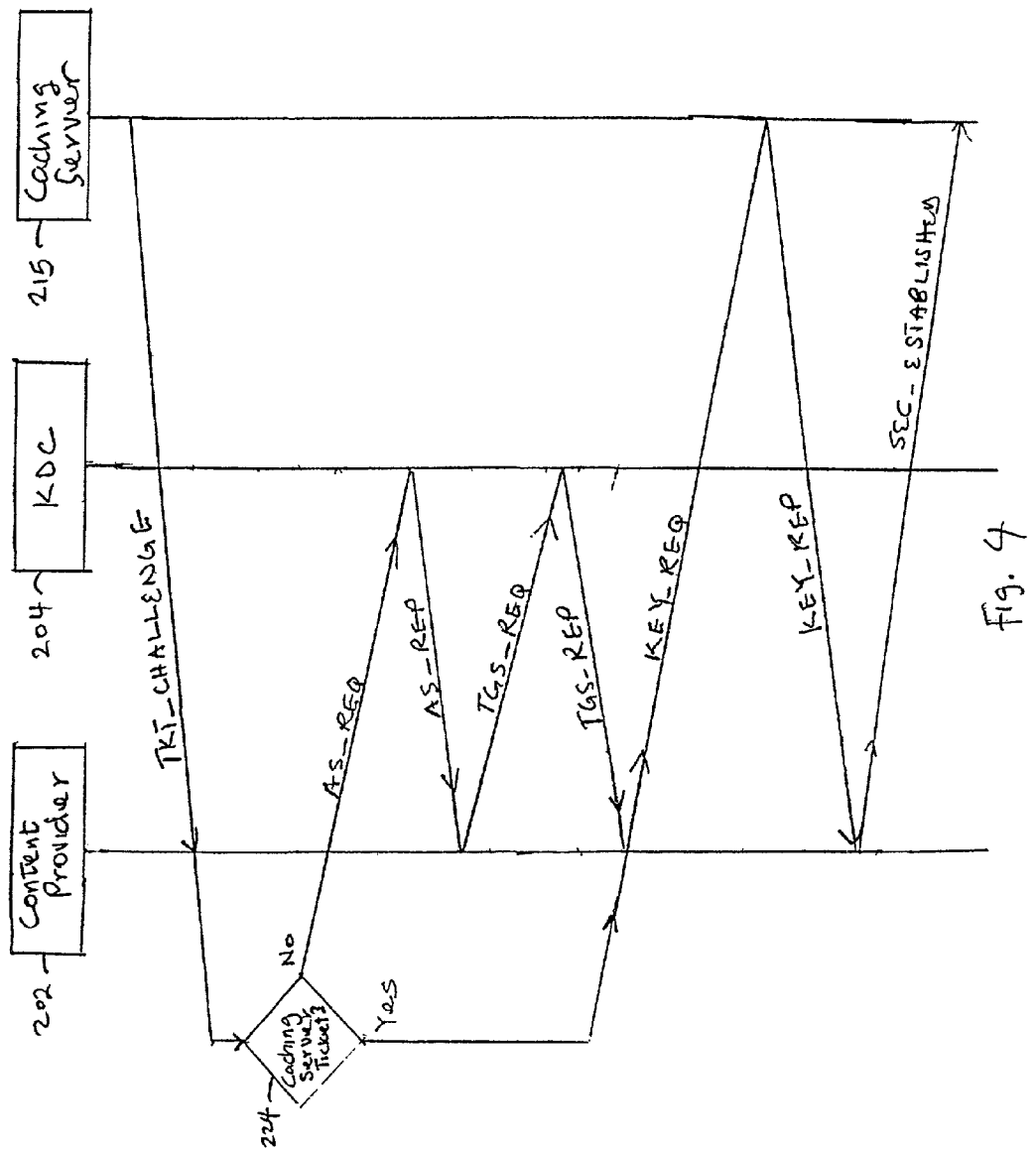
FIG. 4 is a high-level flow diagram of the security and key management protocol when key management is initiated from a caching server (server) to a content provider (client) in accordance with an exemplary embodiment of the present invention.

FIG. 4 is a high-level flow diagram of the security and key management protocol when key management is initiated from caching server 215 (server) to content provider 202 (client) in accordance with an exemplary embodiment of the present invention.

Key management is initiated by caching server 215 when a request for content is received and caching server 215 does not have the requested content. As shown, key management is initiated by sending a TKT_CHALLENGE (ticket challenge) message from the caching server 215 to content provider 202. The TKT_CHALLENGE is for use by a server to direct a client to initiate key management.

At decision block 224, if content provider 202 has a previously obtained caching server ticket, it forwards a KEY_REQ message containing the ticket to caching server 215. In response, caching server 215 sends a KEY_REP message as previously discussed above. On the other hand, returning to decision block 224, if content provider 202 has no caching server ticket and no TGT, it sends an AS_REQ message to KDC 204 which replies with an AS_REP message. If the content provider has its TGT the AS_REQ/REP is skipped.

Thereafter, content provider 202 sends a TGS_REQ message to KDC 204, and receives a TGS_REP message containing the caching server ticket. When the caching ticket is obtained, content provider 202 sends a KEY_REQ message in this case with no DOI object. The session ID may be either in the reply or the request or both; session rights don't apply since neither content provider 202 nor caching server 215 is a consumer. Once the shared key is established, SEC_ESTABLISHED message (not shown) is sent to caching server 215 by content provider 202. Since the server initiated key management, the SEC_ESTABLISHED message informs the server that security has been established. See line 13, above. But, the SEC_ESTABISHED message has been added to FIG. 4.

Advantageously, it should be observed that the same messages namely TKT_CHALLENGE, AS_REQ/AS_REP, TGS_REQ/TGS_REP, KEY_REQ/KEY_REP, SECURITY_ESTABLISHED are used in multiple protocols and scenarios depending on whether a client or server initiates key management. If the server requests key management, all of the messages are used including the TKT_CHALLENGE message. Contrawise, if the client initiates key management all messages other than the TKT_CHALLENGE are employed. It should be observed that the Security Established message is also commonly skipped when client initiates key management. Advantageously, because a single key management protocol is utilized on all interfaces, it is easier to analyze whether the system is secure. In addition, the system secures both streaming content and non-streaming content including billing data with the same key management with changes only to the DOI object field.

Figure 5:
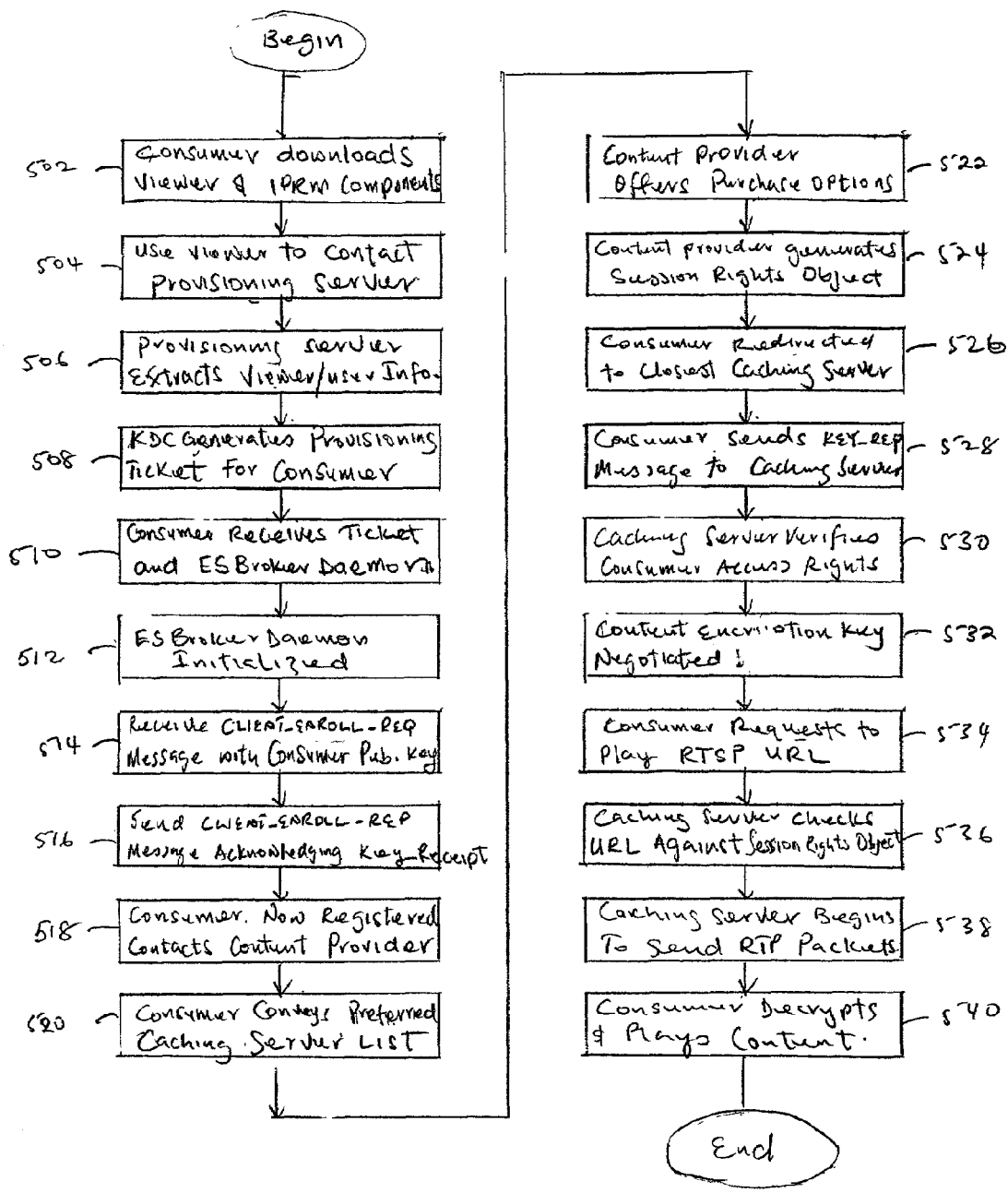
FIG. 5 is a block diagram illustrating initial registration and the receipt of content by a consumer in accordance with an exemplary embodiment of the present invention.

FIG. 5 is a block diagram illustrating initial registration and the receipt of content by consumer 216 in accordance with an exemplary embodiment of the present invention.

A new consumer 216 wishing to receive content from caching server 215 may initially sign up with central unit 218.

At block 502, consumer 216 using a web browser accesses a web site (not shown) provided by central unit 218. Consumer 216 comes to the initial sign-up and software download page, downloads and installs a viewer application, including any IPRM components. Alternatively, the viewer application and IPRM components could be distributed to consumers with removable media, such as a CD-ROM.

At block 504, consumer 216 starts up the viewer to initiate an SSL (secured socket layer) session with provisioning server 220. The session is initiated using a central unit 218 certificate (not shown). The certificate is the signed public key of the central unit 218 previously obtained by consumer 216. After the SSL session begins, consumer 216 fills out the initial signup form, which includes a form for a user ID. Or, the user ID can be automatically assigned by the central unit. Consumer 216 next determines a local host identifier and sends it to provisioning server 220 along with other information. (This is done transparently by the viewer).

At block 506, provisioning server 220 extracts the user ID and converts it to an ESBroker™ principal name. A principal name is a uniquely named consumer or server instance that participates in IPRM system 200. In this case, the viewer principal name is the same as a subscriber id assigned to that viewer. After the user ID is converted to an ESBroker™ principal name, provisioning server 220 sends a command to KDC 204 to generate a new ESBroker™ principal in KDC 204 database (not shown). This command also includes a consumer 216 host identifier.

At block 508, KDC 204 generates a provisioning ticket containing a provisioning key (session key) for consumer 216. The provisioning key may be a symmetric key in one embodiment of the present invention. The provisioning key is used by KDC 204 for authentication of messages between itself and consumer 216. Thereafter, the provisioning ticket is returned to provisioning server 220 along with an SKS (Session Key Seed). Because consumer 216 has no access to the provisioning key (encrypted with a KDC 204 key), the SKS is used by consumer 216 to reconstruct the provisioning key located within the provisioning ticket.

At block 510, in addition to the provisioning ticket, configuration parameters including the user ID, ticket expiration time (already included in the non-encrypted part of the ticket), KDC 204 name and/or address etc. and (optionally) software components including an ESBroker™ software are downloaded by consumer 216. It should be observed that the software components might have been downloaded pervious to this registration procedure, as is the case in the Aerocast network.) Thereafter, the SSL connection is terminated.

At block 512, the ESBroker™ software is initialized using the downloaded configuration parameters.

At block 514, a public/private key pair for authenticating AS_REQ messages between consumer 216 and KDC 204 is generated. The public key is forwarded to KDC 204 from consumer 216. This is accomplished using a CLIENT_ENROLL_REQ message. The message contains the public key (symmetrically) signed with the provisioning key derived from the SKS by consumer 216. Since there is no access to the provisioning key within the provisioning ticket, consumer 216 derives the provisioning key from the SKS using a one-way function. The problem with distributing tickets and provisioning keys to software clients is that a software client may copy the ticket and key for forwarding to an unauthorized software client. To address this problem, consumer 216 receives the SKS instead of the actual provisioning key. Combining SKS with a unique host identifier using a one-way function generates the provisioning key. The SKS is specific to a particular host and can't be used anywhere else. In the present embodiment, consumer 216 executes the following function to reproduce the provisioning key:

Provisioning key=SKGen(Host ID, SKS)

Where SKGen () is a one-way function; SKGen$^{-1}$ () cannot be calculated within reasonable amount of time (e.g. in less than the ticket lifetime).

At block 516, upon receiving the CLIENT_ENROLL_REQ message, KDC 204 finds consumer 216 in its local database to verify the request. If the request is valid, KDC 204 stores the public key either in a client database that could be located locally on the KDC or at some other remote location with secure access. Alternatively, KDC 204 may generate a certificate with the public key for forwarding to consumer 216. A message CLIENT_ENROLL_REP acknowledging the key has been stored (or alternatively containing a client certificate) is then forwarded to consumer 216.

At block 518, consumer 216 is now enrolled and may contact a web site (not shown) with a database 208 having a listing a content from various providers including content provider 202. When the desired content is located, consumer 216 gets redirected to content provider 202.

At block 520, consumer 216 then contacts content provider 202 to which it was redirected and conveys its preferred list of caching servers, list of subscribed services, its ability to pay for content, etc.

At block 522, content provider 202 offers an optimized subset of purchase options that depend upon the context of the particular consumer and service. For example, price selection screens may be bypassed for consumers already subscribed to this service.

At block 524, content provider 202 generates a session rights object that encapsulates the purchase options selected by consumer 216, an optional set of content access rules (e.g., blackout regions) and a reference to the selected content. For example, a session ID which is a random number that was generated by consumer 216 when it requested these session sights from the content provider. An End Time after which these session rights are no longer valid, a ProviderID, PurchaseOption selected by consumer 216, etc.

At block 526, content provider 202 redirects consumer 216 to the appropriate caching server. In this case, content will be streamed from caching server 215 which is closest to consumer 216. If consumer 216 had previously cached a caching server ticket for caching server 215 when it signed up, it retrieves that ticket. If it has no cached ticket, it contacts KDC 204 using a TGT to obtain the correct caching server ticket.

At block 528, consumer 216 authenticates itself to caching server 215 using the caching server ticket, and at the same time (in the same KEY_REQ message) forwards the session rights object obtained from content provider 202 to caching server 215. Communication between consumer 216 and caching server 215 is accomplished using the KEY_REQ/KEY_REP messages, above.

At block 530, caching server 215 checks the access rules from the session rights object against consumer 216's entitlements contained in the ticket and also against the user selection (purchase option selected by the consumer) in the session rights object The entitlements are basically authorization data specific to consumer 216 which allows access to content. The set of content access rules is optional because it might have been delivered directly to caching server 215 with the content. Furthermore, caching server 215 can optionally gather additional content access rules from multiple sources. For example, an access network provider (e.g. cable system operator) might impose some restrictions for delivery over its network.

At block 532, if access is approved, consumer 216 and caching server 215 negotiate a Content Encryption Key (CEK) for delivery of the content.

At block 534, security parameters for securing communications during the streaming session are established. Among other parameters, the security parameters include MAC (message authentication code) and content encryption keys, the derivation of which is discussed under "Key Derivation," below. A session identifier associated with the security parameters is also established. When consumer 216 starts issuing RTSP commands to the caching server 215 to get description of the content (RTSP URL), and to request to play the content, the RTSP message is secured with the security parameters.

At block 536, caching server 215 receives RTSP commands, decodes them and returns encrypted RTSP responses. When an RTSP command requests to play a specific URL, caching server 215 verifies that the specified URL is what was specified in the session rights object for this secure session, identified by the Session identifier.

At block 538, after receiving a request to play an RTSP URL, caching server 215 establishes a streaming session and begins to send out RTP packets. Both caching server 215 and consumer 216 periodically send RTCP report packets. All RTP and RTCP packets are encrypted with the security parameters. Further, the RTP and RTCP packets associated with the same RTSP URL are encrypted using the security associations identified by the same Session ID, the Session ID that was recorded when caching server 215 started receiving encrypted RTSP messages from consumer 216. It should be observed that the RTSP, RTP and RTCP messages may be exchanged in any order, each message being secured with the security parameters which are identifiable with the session identifier.

At block 540, consumer 216 decrypts and plays the content. At the same time, consumer 216 may issue additional RTSP commands (e.g. to pause or resume content play out), still encrypted using the same Session ID. Caching server 215 keeps track of who viewed the content, how long the content was viewed, and under what mechanism the content was purchased.

Streaming and Non-Streaming Content

There are two basic categories of content that are protected: streaming and non-streaming content. The following protocols are used to deliver either the actual streaming content or information related to the content: Streaming Content: RTP (real-time protocol)/RTCP (real-time control protocol), RTSP (real-time streaming protocol). Non-streaming transfer of content between servers: Transfer Agent Protocol (modified RTSP), Streaming Description: RTSP with SDP (session description protocol). Other Non-Streaming Content: HTTP (provisioning, content publishing to the directory); Custom protocols over either TCP (transport control protocol) or UDP (user datagram protocol) (content usage reporting). In standards-based systems, the streaming content is typically delivered using the RTP. There are additional proprietary streaming protocols such as Real and Microsoft's Windows Media that may be employed. Note that these protocols are exemplary as other type protocols may be employed.

Key Derivation

This key derivation procedure is specific to the IPRM DOI_ID value and is applicable to media streams as well as other target protocols that fall under the same DOI_ID. After the Target Application Secret (TAS) (a concatenation of the ESBroker™ session key and the subkey) has been established with key management, it is used to derive the following set of keys in the specified order. A client (that generated an ESBroker™ KEY_REQ message) derives:

Outbound EK, content encryption key for outbound messages. The length is dependent on the selected cipher.

Outbound $K_{MAC}$, a MAC (Message Authentication Code) key used in the generation of a MAC for authenticating outbound messages. The key length is dependent on the selected message authentication algorithm.

Inbound EK, content encryption key for inbound messages.

Inbound $K_{MAC}$, a MAC key used for authenticating inbound messages.

An application server (that generated an ESBroker™ Key Reply message) derives:

Inbound EK
Inbound $K_{MAC}$
Outbound EK
Outbound $K_{MAC}$

Note that the derivation order of the inbound and outbound keys at the client and server are reversed—this is because the same key used to encrypt outbound traffic on one side is used to decrypt inbound traffic on the other side. Similarly, a MAC key used to generate MACs for outbound messages on one side is used to verify the MAC values on inbound messages on the other side.

Note that not all the keys are used for each protocol. For example, RTP only uses EK, the encryption key, and only for one direction of traffic—because within IPRM there are no two-way RTP sessions (clients don't send RTP packets back to streaming servers).

While the above is a complete description of exemplary specific embodiments of the invention, additional embodiments are also possible. Thus, the above description should not be taken as limiting the scope of the invention, which is defined by the appended claims along with their full scope of equivalents.

What is claimed is:

1. A method for securely streaming real-time data, the method comprising:
    establishing security parameters for securing the real-time data;
    establishing a session identifier associated with the security parameters;
    securely transferring the real-time data by
        exchanging two or more protocol messages for streaming the real-time data, each protocol message being secured by the security parameters; and
    the security parameters being identifiable using the session identifier.

2. The method of claim 1 wherein the step of exchanging two or more protocol messages comprises:
    transmitting an RTSP (real-time streaming protocol) message from the client to the server, the RTSP message requesting the real-time data stream; and
    responsive to the request, transmitting by the server an RTSP message containing a list of RTP (real-time protocol) and RTCP (real-time control protocol) ports for streaming the real data time stream.

3. A method for securely transferring a real-time data stream, the method comprising:
    establishing one or more security parameters for securing the data stream;
    establishing a session identifier associated with the security parameters;
    transmitting an RTSP (real-time streaming protocol) message from a client to a server, the RTSP message for requesting the real-time data stream,
    wherein the RTSP message is secured by the security parameters;
    transmitting an RTP (real-time protocol) message containing the real-time data,
    the RTP message being secured by the security parameters;
    exchanging in any order two or more protocol messages selected from the group comprising: an RTSP message, an RTP and an RTCP (real-time control protocol), each message being secured by the security parameters; and
    the security parameters being identifiable using the session identifier.

4. The method of claim 3 wherein the security parameters comprises:
    a first encryption key for encrypting outbound messages;
    a second key for authenticating outbound messages;
    a third encryption key for inbound messages; and
    a fourth encryption key authenticating inbound messages.

5. In a client-server system, a method for securely communicating real-time data, the method comprising:
    establishing security parameters for securely transferring the real-time data;
    establishing a session identifier associated with the security parameters;
    transmitting, from a client to a server, a first protocol message for requesting the real-time data, the first protocol message being secured with the security parameters;
    establishing a streaming session for streaming a second protocol message containing the real-time data, the second protocol message being secured with the security parameters; and
    exchanging additional protocol messages in any order, each message being secured with the security parameters which are identifiable with the session identifier.

6. The method of claim 5 wherein the security parameter further comprises:
    a first encryption key for encrypting outbound messages;
    a second key for authenticating outbound messages;
    a third encryption key for inbound messages; and
    a fourth encryption key authenticating inbound messages.

7. The method of claim 1 wherein the protocol messages are selected from the group consisting of RTSP message, RTP message and RTCP messages.

* * * * *

UNITED STATES PATENT AND TRADEMARK OFFICE
CERTIFICATE OF CORRECTION

PATENT NO. : 7,356,687 B2  Page 1 of 1
APPLICATION NO. : 10/153445
DATED : April 8, 2008
INVENTOR(S) : Medvinsky et al.

It is certified that error appears in the above-identified patent and that said Letters Patent is hereby corrected as shown below:

On the Title Page, Item (56), under "OTHER PUBLICATIONS", in Column 2, Line 2, please delete "Progamming" and insert --Programming--

Signed and Sealed this

Fifteenth Day of September, 2009

David J. Kappos
*Director of the United States Patent and Trademark Office*